No. 681,026. Patented Aug. 20, 1901.
C. A. KLITZKE.
CORN HARVESTER.
(Application filed Mar. 21, 1901.)
(No Model.) 3 Sheets—Sheet 1.
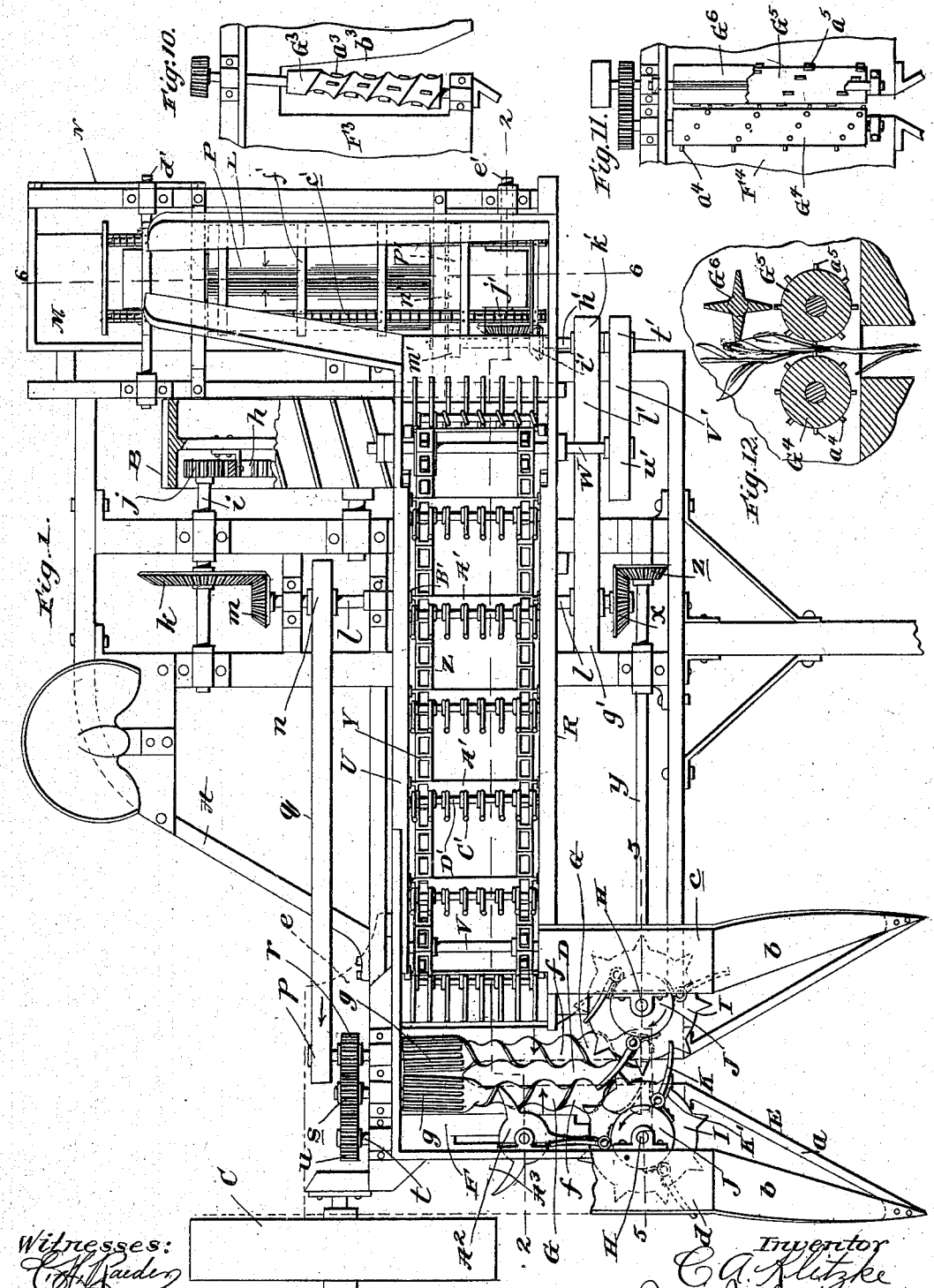

No. 681,026. Patented Aug. 20, 1901.
C. A. KLITZKE.
CORN HARVESTER.
(Application filed Mar. 21, 1901.)
(No Model.) 3 Sheets—Sheet 2.
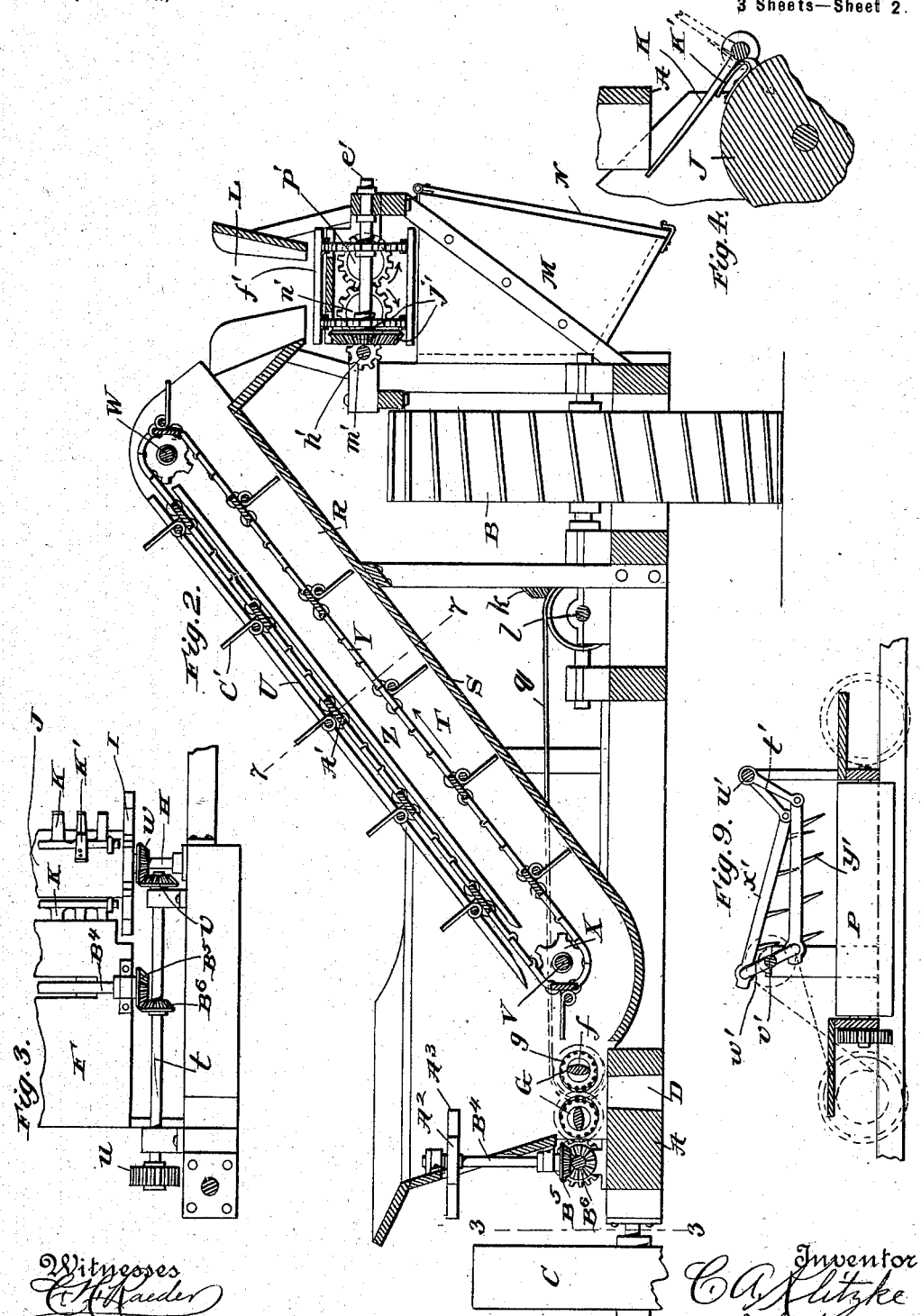

No. 681,026. Patented Aug. 20, 1901.
C. A. KLITZKE.
CORN HARVESTER.
(Application filed Mar. 21, 1901.)
(No Model.) 3 Sheets—Sheet 3.
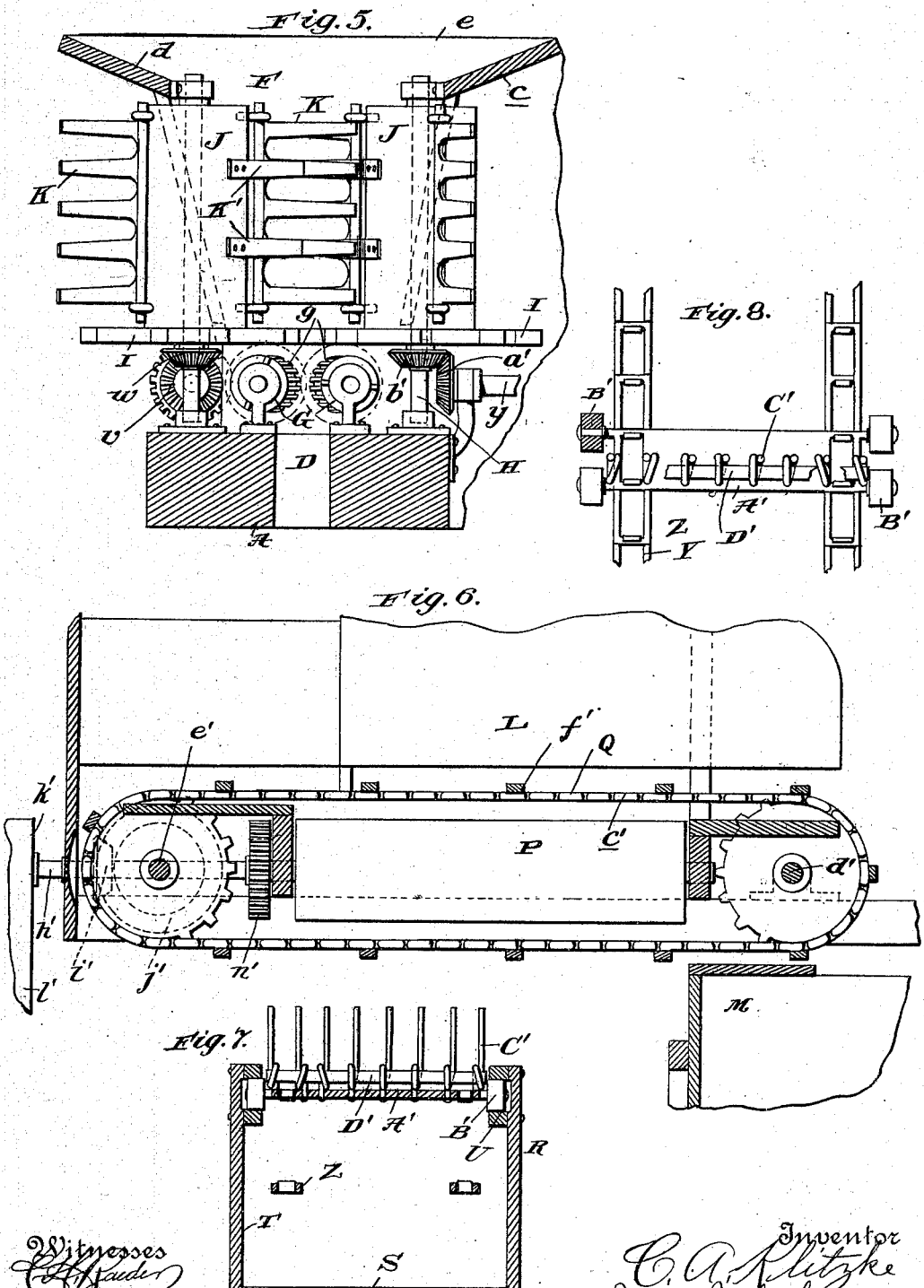

UNITED STATES PATENT OFFICE.

CHARLES A. KLITZKE, OF REEDSBURG, WISCONSIN.

CORN-HARVESTER.

SPECIFICATION forming part of Letters Patent No. 681,026, dated August 20, 1901.

Application filed March 21, 1901. Serial No. 52,210. (No model.)

*To all whom it may concern:*

Be it known that I, CHARLES A. KLITZKE, a citizen of the United States, residing at Reedsburg, in the county of Sauk and State of Wisconsin, have invented new and useful Improvements in Corn-Harvesters, of which the following is a specification.

My invention relates to corn-harvesters of the kind which are calculated to traverse fields of corn, remove the ears from the stalks, and husk the ears; and it consists in a certain peculiar construction the novelty, utility, and advantages of which will be fully understood from the following description and claims when taken in conjunction with the accompanying drawings, in which—

Figure 1 is a plan view of my improved corn-harvester with a portion of the traveling drive-wheel in section. Fig. 2 is a vertical section taken in the plane indicated by the broken line 2 2 of Fig. 1. Fig. 3 is a detail section taken in the plane indicated by the broken line 3 3 of Fig. 2. Fig. 4 is a detail horizontal section, on an enlarged scale, illustrating the manner in which the stalk-feeding forks pass the frame incident to the rotation of the cylinders to which they are attached. Fig. 5 is a detail section taken in the plane indicated by the broken line 5 5 of Fig. 1 with the cylinders to which the forks are attached in elevation. Fig. 6 is an enlarged section taken in the plane indicated by the broken line 6 6 of Fig. 1. Fig. 7 is a detail section taken in the plane indicated by the broken line 7 7 of Fig. 2. Fig. 8 is a detail view of a portion of the endless carrier for removing the ears of corn from the stalk-stripping rolls to the husking or shucking rolls. Fig. 9 is a detail section illustrating a modified mechanism for moving the ears of corn along the husking-rolls incident to the husking operation. Figs. 10 and 11 are detail horizontal views of modifications. Fig. 12 is a detail view taken at right angles to Fig. 11.

Referring by letter to Figs. 1 to 9, A is the main frame of my improved harvester, which may be of any construction and material suitable to the purposes of my invention. The said frame is supported by wheels B C and is provided adjacent to the latter wheel with a slot D, the said slot being open at its forward end, as best shown in Fig. 1, and designed for the downward passage of the cornstalks after the same have been stripped of their ears. The frame is also provided with a flaring mouth E, which communicates with and has for its purpose to guide stalks of corn into the slot D. This mouth is preferably formed by lower bars $a$, which are connected to the main frame at opposite sides of the slot D and diverge forwardly therefrom in a horizontal plane, and comparatively broad inclined bars $b$, which are connected at their lower ends to the bars $a$ and extend upwardly and rearwardly therefrom, as illustrated, and merge into inclined boards $c\,d$, disposed at opposite sides of the stalk-receiving box F. The inclined board $d$ merges in turn into an inclined board $e$ on the rear wall of the said box F.

Journaled in suitable bearings in the stalk-receiving box F and disposed at opposite sides of the slot D in the bottom thereof are rolls G for feeding the stalks of corn down through the said slot and stripping the same of their ears. These rolls G are provided for about two-thirds of their length with long spiral corrugations $f$ and in rear of the corrugations have longitudinal grooves $g$ in their perimeters. The spiral corrugations are by preference gradually reduced in size as they approach the grooved portions of the rolls, and the corrugations of each roll are arranged coincident with the spaces between the corrugations of the other roll. It will also be observed by reference to Fig. 1 that the corrugations are respectively right and left in the two rolls, and consequently when said rolls are rotated in opposite directions, as indicated by arrows in Fig. 1, the corrugated portions thereof will operate to feed the cornstalks rearwardly and downwardly through the slot D, while the longitudinally-grooved portions $g$ will serve to strip the stalks of the ears. When the machine is in operation, the right-hand roll G is rotated by the traction-wheel B through the medium of the toothed annulus $h$, fixed to said wheel, the shaft $i$, which has a pinion $j$ at one end intermeshed with the annulus and a beveled gear $k$ at an intermediate point of its length, a shaft $l$, disposed at right angles to the shaft $i$ and having a beveled gear $m$ intermeshed with the gear $k$, pulleys $n\,p$, fixed on the shaft $l$ and the shaft of the right-hand roll G, respectively, and a belt $q$, passed around said pulleys $n$ $p$, while the left-hand roll G is rotated in an opposite direction to the right-hand roll through the medium of a gear $r$ on the shaft of said right-hand roll and a gear $s$ on the shaft of the left-hand roll intermeshed with said gear $r$.

In addition to removing the ears of corn from the stalks, as before described, the grooved portions $g$ of the rolls G, which are arranged quite close together, serve to engage and positively feed the stalks downwardly, and thereby prevent choking of the machine, which is obviously a highly-important advantage.

Journaled in suitable bearings at opposite sides of the stalk-receiving box F and adjacent to the forward end of said box are shafts H, which are provided immediately above the plane of the stripping-rolls G with peripherally-toothed wheels I and between said wheels and the boards $c$ $d$ with cylinders J. The said cylinders are provided at intervals on their peripheries with upright forks K, which are pivotally connected thereto and are backed by springs K'. When the shafts H are rotated in opposite directions, the wheels I and the forks K are calculated to engage the stalks of corn received in the mouth E and press or feed the same rearwardly into the slot D and between the stripping-rolls G. The forks K by reason of their being pivotally connected to the cylinders and backed by springs are also adapted to assume the position shown in Fig. 4 when they engage the side walls of the stalk-receiving box, so as to pass said side walls. The left-hand shaft H is driven in the direction indicated by arrow when the machine is in operation by the left-hand stripping-roll G, through the medium of the gear $s$ on the shaft thereof, and a shaft $t$, which at one end is provided with a gear $u$, intermeshed with gear $s$, and at its opposite end has a gear $v$ intermeshed with a gear $w$ on the said shaft H, while the right-hand shaft H is driven in the opposite direction by the shaft $t$ and beveled gear $x$ thereon and a shaft $y$, which has a gear $z$ intermeshed with the gear $x$ and another gear $a'$ intermeshed with a gear $b'$ on said right-hand shaft H.

I prefer in practice to employ three forks K on each of the cylinders J, and the said forks, in conjunction with the toothed wheels I, are obviously calculated to positively feed an abundant supply of cornstalks to the stalk-receiving box and the stripping-rolls as the machine progresses through the field of corn.

L is a bottomless trough, which is arranged at the opposite side of the machine with reference to the stalk-receiving box F and in a plane above said stalk-receiving box, as illustrated in Fig. 2. The forward end of this trough, which is arranged fore and aft of the machine, is closed, while the rear end thereof is arranged to discharge into a box M, the said box having a normally closed hinged door N, whereby it may be readily discharged of its contents when desired.

Disposed below the trough L are two rolls P, while between the said rolls and the trough is arranged the upper stretch of an endless carrier Q. The endless carrier preferably comprises chains $c'$, which take around sprocket-wheels on shafts $d'$ $e'$ and cross-bars $f'$, which are connected to the chains at intervals in the length thereof, and it is driven when the machine is in operation from the shaft $l$, through the medium of a pulley $g'$ thereon, a shaft $h'$, which has a beveled gear $i'$ intermeshed with a similar gear $j'$ on the shaft $e'$, and also has a pulley $k'$ and a belt $l'$, which takes around the pulleys $g'$ $k'$. On the shaft $h'$ is also arranged a pinion $m'$ in engagement with a gear $n'$, which is fixed on the left-hand roll P and intermeshed with a gear $p'$, fixed on the right-hand roll P. From the foregoing it follows that when the machine is traveling forwardly the upper stretch of the carrier Q will be caused to travel rearwardly, while the rolls P will be rotated in opposite directions, as indicated by arrows. The rolls P have for their purpose to husk or shuck the ears of corn as the ears are moved rearwardly over the same by the endless carrier Q, while the said carrier, in addition to moving the ears of corn rearwardly over the rolls P, is designed to deliver the husked ears to the box M.

Interposed between the stalk-receiving box F and the trough L is an inclined casing R, which comprises a bottom wall S, the lower end portion of which is curved and arranged adjacent to the bottom of said box, and side walls T, provided with longitudinal guideways U. In this casing are journaled shafts V W, which are provided with sprocket-wheels X for the engagement of the chains Y of an endless carrier Z. The said chains are connected at intervals of their length by cross-bars A', which are provided at their ends with antifriction-rollers B', arranged to travel in the guideways of the casing. The bars A' are also provided with teeth C', which are coiled about rods D' and have their inner ends secured in the bars after the manner best shown in Fig. 7.

By virtue of the lower end of the casing-bottom being curved and the bars of the endless carrier being provided with teeth it will be observed that the said endless carrier is enabled to receive the ears of corn as the ears are delivered from the stripping-rolls and carry the same upwardly and deliver them into the trough L to be husked or shucked by the mechanism before described. The endless carrier is designed to be driven when the machine is in operation by the shaft $h'$ through the medium of a pulley $t'$, fixed thereon, a pulley $u'$, fixed on the upper shaft W, and a belt V', passed around said pulleys, as shown in Fig. 1.

In the practical operation of my improved harvester it will be seen that as the same traverses a field of corn the stalks will be guided by the mouth E into engagement with the toothed wheels I and the forks K, and will be thereby forced rearwardly into engagement with the stripping-rolls G. When the stalks reach a position between the forward corrugated portions of the rolls G, they will be gradually fed rearwardly and downwardly until their ears reach the rear grooved portions $g$ of the roll, when the said grooved portions will operate to strip the stalks of the ears and positively feed the stalks downwardly and permit the same to pass through the slot D. After the stalks are received between the corrugated portions of the rolls G, the rearward and downward movement thereof is accelerated by a horizontally-disposed wheel $A^2$, which is equipped with a plurality of arms $A^3$, as shown. The said wheel $A^2$ is located in rear of the left-hand shaft H and is carried by an upright shaft $B^4$, which is provided at its lower end with a gear $B^5$, intermeshed with a gear $B^6$ on the shaft $t$, as clearly shown in Fig. 2 of the drawings. After the ears of corn are removed from the stalks by the grooved portions $g$ of the stripping-rolls, they are delivered to the fingers of the endless carrier and by the latter are elevated and discharged into the trough L. When discharged into the trough L, the ears fall upon the rolls P and are slowly moved rearwardly on the same by the endless carrier Q. Incident to such rearward movement of the ears the rolls P operate to remove the husks therefrom and discharge such husks on the ground. The space between the rolls P is, however, too narrow for the passage of the ears, and consequently the ears are conveyed by the carrier to the box M to be delivered therefrom at intervals, as before described.

In lieu of the endless carrier Q the mechanism shown in Fig. 9 may be employed for feeding the ears of corn lengthwise of the husking-rolls P. The said mechanism comprises arms $t'$, loosely connected to and depending from a suitably-supported shaft $u'$, a shaft $v'$, having oppositely-disposed cranks $w'$, and bars $x'$, connected to the cranks $w'$ and arms $t'$ and equipped with teeth $y'$. By reason of this construction it will be observed that when the shaft $v'$ is rotated and the bars $x'$ oscillated the teeth on the latter will operate to feed the ears of corn rearwardly on the rolls P and will also serve by picking loose the leaves on the ears to enable the rolls P to more readily take hold of said leaves or husks and tear the same from the ears.

I prefer in practice to provide the rear portions of the stripping-rolls G with longitudinal grooves $g$ in order to enable the said rolls to positively engage the stalks and feed the same downwardly after they have been stripped of their ears. I do not desire, however, to be understood as confining myself to the employment of gripping-surfaces formed by longitudinal grooves at the rear portions of the rolls, as the said gripping-surfaces may be of any suitable character.

When desirable, but one cylinder J and its appurtenances may be employed at one side of the box F, although I prefer to employ two cylinders and their appurtenances, as shown and described.

In Fig. 10 of the drawings I have illustrated a modified construction in which but a single roll $G^3$ is employed at the bottom of a stalk-receiving box $F^3$. Said roll is provided with spiral corrugations and between the same with teeth $a^3$, affording a gripping-surface, and is arranged adjacent to one side $b^3$ of the frame, whereby it will be seen that it will serve in conjunction with said side $b^3$ to feed the stalks rearwardly and strip or remove the ears of corn therefrom.

The construction shown in Fig. 11 comprises a stalk-receiving box or frame $F^4$, open at its forward end, two rolls $G^4$ $G^5$, and a third roll $G^6$, disposed above the roll $G^5$. The roll $G^4$ is provided with teeth $a^4$ and the roll $G^5$ with short longitudinally-disposed ribs $a^5$, while the third roll $G^6$ is of the shape best shown in Fig. 12 and is calculated to bend the ears of corn to one side after the manner illustrated, so as to break or remove the ears from the stalks without pinching the ears.

Having described my invention, what I claim, and desire to secure by Letters Patent, is—

1. A corn-harvester mounted on wheels whereby it is adapted to traverse a field of corn, and comprising a stalk-receiving box having a slot in its bottom open at its forward end, a stripping-roll arranged in said box, a complementary appliance arranged adjacent to the stripping-roll and adapted in conjunction therewith to remove ears of corn from the stalks, means for feeding the stalks to the stripping-roll and its complementary appliance, a trough arranged in a plane above the stripping-roll and its complementary appliance, and at the opposite side of the machine, and open at its bottom and rear end, the inclined casing interposed between the stripping-roll and its complementary appliance and the trough, and having the lower portion of its bottom wall dished and arranged below the bottom wall of the stalk-receiving box, and also arranged in the same crosswise plane as the stripping-roll and its complementary appliance, an endless carrier arranged in said casing for conveying the ears of corn direct from the stripping-roll and complementary appliance to the trough, husking or shucking mechanism disposed below the bottomless trough, and means for moving the ears in said trough.

2. In a corn-harvester, the combination of the stalk-receiving box having a slot in its bottom, open at its forward end, and also having a flaring mouth communicating with said slot, a stripping-roll arranged in said box, a complementary appliance arranged adjacent to the stripping-roll and adapted in conjunction therewith to remove ears of corn from the stalks, a trough arranged in a plane above the stripping-roll and its complementary appliance, and at the opposite side of the machine, and open at its bottom and rear end, the inclined casing interposed between the stripping-roll and its complementary appliance and the trough, and having the lower portion of its bottom wall dished and arranged below the bottom wall of the stalk-receiving box, and also arranged in the same crosswise plane as the stripping-roll and its complementary appliance, an endless carrier arranged in said casing for conveying the ears of corn direct from the stripping-roll and complementary appliance to the trough, husking mechanism disposed below the bottomless trough, means for moving the ears in said trough, a horizontally-disposed toothed wheel mounted at one side of the slot in the bottom of the stalk-receiving box, a cylinder arranged above said toothed wheel, upright forks pivotally connected to the cylinder, and springs backing the forks and operating to normally hold them in an extended position with reference to the cylinder.

3. In a corn-harvester, the combination with the stalk-receiving box having a slot in its bottom, open at its forward end, and also having a flaring mouth communicating with said slot; of one or more stripping-rolls arranged in the box, one or more horizontally-disposed toothed wheels mounted at the side or sides of the slot, and a cylinder or cylinders arranged above the toothed wheel or wheels; upright forks pivotally connected to the cylinder or cylinders, and springs backing the forks and operating to normally hold them in an extended position with reference to the cylinder or cylinders; the said toothed wheels and forks of the cylinders being adapted, when rotated, to force or feed cornstalks rearwardly in the box.

4. In a corn-harvester, the combination with the stalk-receiving box having a slot in its bottom, open at its forward end, and also having a flaring mouth communicating with said slot; of stripping-rolls arranged in the box and disposed at opposite sides of the longitudinal center of the slot, horizontally-disposed toothed wheels arranged at opposite sides of the forward portion of the slot, upright cylinders disposed above the toothed wheels, upright forks pivotally connected to the cylinders, and springs backing said forks and operating to normally hold them in an extended position with reference to the cylinders.

5. In a corn-harvester, the combination with the stalk-receiving box having a slot in its bottom, open at its forward end, and also having a flaring mouth communicating with said slot; of stripping-rolls arranged in the box and disposed at opposite sides of the longitudinal center of the slot, horizontally-disposed toothed wheels arranged at opposite sides of the forward portion of the slot, upright cylinders disposed above said toothed wheels and carrying upright radially-extending forks, a horizontally-disposed wheel provided with radial arms and arranged in rear of one toothed wheel and the cylinder above the same, and also arranged adjacent to the upper edge of the outer side wall of the box, and suitable means for rotating the toothed wheels, the cylinders, and the wheel having arms.

In testimony whereof I have hereunto set my hand in presence of two subscribing witnesses.

CHARLES A. KLITZKE.

Witnesses:
H. GROTOPHORST,
R. A. ENNIS.